(12) United States Patent
Hishida et al.

(10) Patent No.: US 12,024,048 B2
(45) Date of Patent: Jul. 2, 2024

(54) POWER TRANSMISSION AND RECEPTION MANAGEMENT DEVICE AND COMPUTER-READABLE STORAGE MEDIUM

(71) Applicant: HONDA MOTOR CO., LTD., Tokyo (JP)

(72) Inventors: Motoki Hishida, Saitama (JP); Hakaru Sadano, Saitama (JP); Hiroyuki Kanazawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 397 days.

(21) Appl. No.: 17/371,113

(22) Filed: Jul. 9, 2021

(65) Prior Publication Data

US 2021/0380014 A1 Dec. 9, 2021

Related U.S. Application Data

(63) Continuation of application No. PCT/JP2019/001203, filed on Jan. 17, 2019.

(51) Int. Cl.
*B60L 53/65* (2019.01)
*B60L 53/66* (2019.01)

(52) U.S. Cl.
CPC ............... *B60L 53/66* (2019.02); *B60L 53/65* (2019.02)

(58) Field of Classification Search
None
See application file for complete search history.

(56) References Cited

U.S. PATENT DOCUMENTS 9,153,966 B2 * 10/2015 Ishida .................. G07F 15/008
10,763,692 B2 * 9/2020 Pelletier ................ G05B 15/02
(Continued)

FOREIGN PATENT DOCUMENTS

CN 102792547 A 11/2012
CN 103733213 A 4/2014
(Continued)

OTHER PUBLICATIONS

International Preliminary Report on Patentability for International Application No. PCT/JP2019/001203, issued by the International Bureau of WIPO dated Jun. 16, 2021.
(Continued)

*Primary Examiner* — Jason Lin

(57) ABSTRACT

There is provided a power transmission and reception management device including: a user information storage unit configured to store information indicating correspondences between a first user and a plurality of second users; a vehicle information storage unit configured to store information indicating correspondences between the plurality of second users, and a plurality of vehicles that include driving power sources; an acquisition unit configured to acquire, from the first user, schedule information indicating a scheduled period during which at least a part of the plurality of vehicles are available for power transmission and reception with a power network; and a consideration control unit configured to associate, with the first user, consideration information indicating a consideration to be provided to the first user when at least a part of the plurality of vehicles are available for power transmission and reception with the power network during the scheduled period.

14 Claims, 12 Drawing Sheets

(56) References Cited

U.S. PATENT DOCUMENTS

| | | | |
|---|---|---|---|
| 10,926,657 B2* | 2/2021 | Schlaudraff | B60L 53/65 |
| 11,623,527 B2* | 4/2023 | Ramanujam | B60L 3/12 |
| | | | 701/22 |
| 2010/0082464 A1* | 4/2010 | Keefe | G06Q 40/12 |
| | | | 705/30 |
| 2010/0306033 A1* | 12/2010 | Oved | G07F 15/003 |
| | | | 705/14.1 |
| 2011/0196692 A1* | 8/2011 | Chavez, Jr. | B60L 53/665 |
| | | | 700/297 |
| 2011/0202192 A1 | 8/2011 | Kempton | |
| 2012/0143385 A1* | 6/2012 | Goldsmith | H02J 3/466 |
| | | | 700/297 |
| 2012/0166012 A1* | 6/2012 | Lee | B60L 53/65 |
| | | | 700/297 |
| 2012/0203409 A1* | 8/2012 | Sekijima | B60L 53/66 |
| | | | 713/320 |
| 2012/0330494 A1* | 12/2012 | Hendrix | B60L 53/66 |
| | | | 701/29.3 |
| 2013/0009599 A1* | 1/2013 | Yukizane | B60L 53/63 |
| | | | 320/109 |
| 2013/0030580 A1 | 1/2013 | Luke | |
| 2013/0202207 A1 | 8/2013 | Ryu | |
| 2013/0211988 A1* | 8/2013 | Dorn | B60L 53/65 |
| | | | 700/297 |
| 2013/0346308 A1* | 12/2013 | Naito | B60L 53/68 |
| | | | 705/41 |
| 2014/0042978 A1 | 2/2014 | Nishibayashi | |
| 2015/0039391 A1* | 2/2015 | Hershkovitz | G06Q 30/0202 |
| | | | 705/7.31 |
| 2016/0280089 A1* | 9/2016 | Uyeki | B60L 53/63 |
| 2017/0136911 A1* | 5/2017 | Ricci | B60L 53/122 |
| 2018/0218459 A1 | 8/2018 | Yokoyama | |
| 2019/0061535 A1* | 2/2019 | Bridges | H02J 3/381 |
| 2019/0148944 A1* | 5/2019 | Shiga | G01W 1/10 |
| | | | 307/19 |
| 2021/0018331 A1* | 1/2021 | Tsuchiya | G01C 21/3697 |
| 2021/0347275 A1* | 11/2021 | Chakraborty | B60L 53/53 |
| 2021/0380014 A1* | 12/2021 | Hishida | H02J 7/00 |
| 2023/0182601 A1* | 6/2023 | Kothari | B60L 53/65 |
| | | | 320/109 |

FOREIGN PATENT DOCUMENTS

| | | |
|---|---|---|
| CN | 103858305 A | 6/2014 |
| CN | 108376373 A | 8/2018 |
| JP | 2009183086 A | 8/2009 |
| JP | 2012228124 A | 11/2012 |
| JP | 5675727 B2 | 2/2015 |
| JP | 5931037 B2 | 6/2016 |
| JP | 2018207590 A | 12/2018 |

OTHER PUBLICATIONS

Office Action issued for counterpart Chinese Application 201980086415.6, issued by The State Intellectual Property Office of People's Republic of China dated Aug. 26, 2023.

* cited by examiner

| PRIMARY USER ID | SECONDARY USER ID |
|---|---|
| U1000 | U1001 |
| | U1002 |
| | U1003 |
| | ⋮ |
| U2000 | U2001 |
| | U2002 |
| | U2003 |
| | ⋮ |

*FIG. 3*

| USER ID | VEHICLE ID | UPPER LIMIT POWER FOR CHARGING AND DISCHARGING |
|---|---|---|
| 1000 | V5000 | 6kW |
| 1001 | V5001 | 2kW |
| 1002 | V5002 | 6kW |
| ⋮ | ⋮ | ⋮ |
| 2000 | V6001 | 6kW |
| 2001 | V6002 | 2kW |
| 2002 | V6003 | 2kW |
| ⋮ | ⋮ | ⋮ |

FIG. 4

| SCHEDULE ID | PRIMARY USER ID | START TIME | END TIME | STATUS |
|---|---|---|---|---|
| A7000 | U1000 | 2018/9/30 16:00 | 2018/9/30 18:00 | APPROVAL |
| A7001 | U1001 | 2018/10/2 13:00 | 2018/10/2 15:00 | RECRUITING |
| ... | ... | ... | ... | ... |

*FIG. 5*

| SCHEDULE ID | PARTICIPANT ID |
|---|---|
| A7000 | U1000 |
| | U1002 |
| | ⋮ |
| | U1048 |
| ⋮ | ⋮ |

*FIG. 6*

| VEHICLE ID | CONNECTION START TIME | CONNECTION END TIME | AMOUNT OF POWER TRANSMISSION AND RECEPTION |
|---|---|---|---|
| V5000 | 2018/9/30 12:00 | 2018/10/1 7:00 | 3.5kWh |
| V5002 | 2018/9/30 13:00 | 2018/9/30 18:00 | 11kWh |
| ⋮ | ⋮ | ⋮ | ⋮ |

*FIG. 7*

| USER ID | CURRENT POINTS | TOTAL POINTS |
|---------|----------------|--------------|
| U1000 | 1500 | 12000 |
| U1002 | 750 | 8000 |
| ⋮ | ⋮ | ⋮ |

POWER TRANSMISSION AND RECEPTION MANAGEMENT DEVICE AND COMPUTER-READABLE STORAGE MEDIUM

CROSS REFERENCE TO RELATED APPLICATION

The contents of the following international application are incorporated herein by reference:
International Application NO. PCT/JP2019/001203 filed on Jan. 17, 2019.

BACKGROUND

1. Technical Field

The present invention relates to a power transmission and reception management device and a computer-readable storage medium.

2. Related Art

In a system including a power system network and a consumer side system, a technique in which based on electrical characteristics of a storage battery and a location where a storage battery system is installed, a part of the storage battery system is selected from the storage battery system, as a group to which a control instruction for charging and discharging is issued is known (for example, refer to Patent Document 1 or the like as described below).

CITATION LIST

Patent Document

[Patent Document 1] Japanese Patent No. 5675727
[Patent Document 2] Japanese Patent No. 5931037

BRIEF DESCRIPTION OF THE DRAWINGS

FIG. 3 shows an example of user information showing correspondence between a user 70 and a user 80 in a table format.
FIG. 4 shows an example of vehicle information showing correspondence between the user 70, the user 80, and a vehicle 30 in a table format.
FIG. 5 shows an example of schedule information of V2G in a table format.
FIG. 6 shows an example of participation information showing a person scheduled to participate in V2G in a table format.
FIG. 7 shows an example of connection history information showing a connection history of the vehicle 30 to a power network 10 in a table format.
FIG. 8 shows an example of consideration information provided by a consideration control unit 200 in a table format.

DESCRIPTION OF EXEMPLARY EMBODIMENTS

Figure 1:
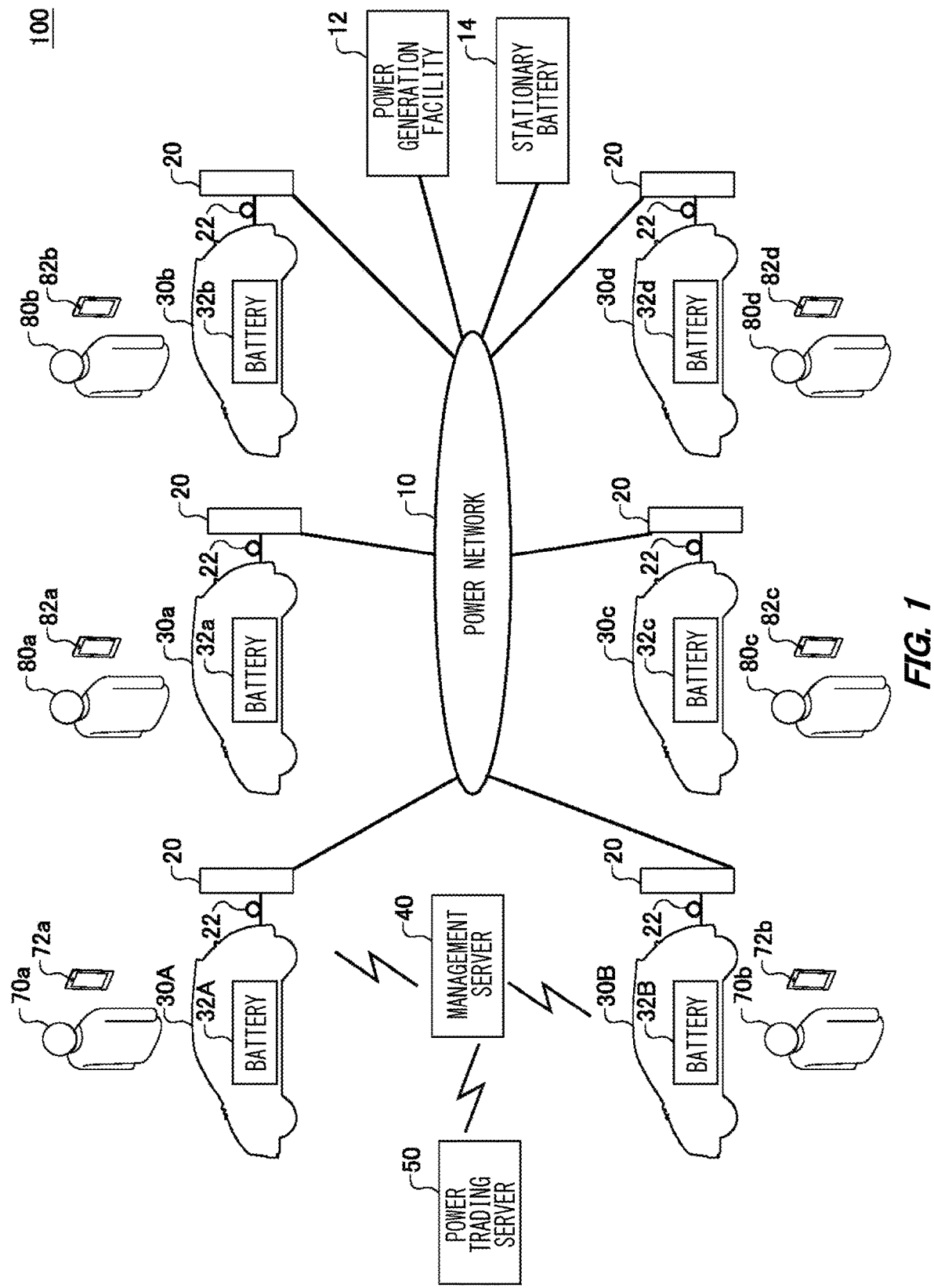
FIG. 1 schematically shows an overall configuration of a power transmission and reception system 100.

Hereinafter, the invention will be described through embodiments of the invention, but the following embodiments do not limit the invention according to claims. Further, not all of the combinations of features described in the embodiments are essential for means to solve the problem in the invention. Note that in the drawings, the same or similar parts may be given the same reference number to omit duplicate descriptions.

FIG. 1 schematically shows an overall configuration of a power transmission and reception system 100. The power transmission and reception system 100 is, for example, a system for a power aggregator to use a battery of a vehicle to perform V2G (Vehicle-to-Grid) for exchange of power between the vehicle and a power network. Note that in the present embodiment, performing at least either release of the power by the vehicle to the power network, or reception of the power by the vehicle from the power network is referred to as V2G.

The power transmission and reception system 100 includes: a plurality of vehicles including a vehicle 30A, a vehicle 30B, a vehicle 30a, a vehicle 30b, a vehicle 30c, and a vehicle 30d; a stationary battery 14; a plurality of charging and discharging facilities 20; a management server 40; a power generation facility 12; and a plurality of user terminals including a user terminal 72a, a user terminal 72b, a user terminal 82a, a user terminal 82b, a user terminal 82c, and a user terminal 82d.

A user 70a is a user of the vehicle 30A. A user 70b is a user of the vehicle 30B. A user 80a is a user of the vehicle 30a. A user 80b is a user of the vehicle 30b. A user 80c is a user of the vehicle 30c. A user 80d is a user of the vehicle 30d. Note that the user of the vehicle may be any person who uses the vehicle such as an owner of the vehicle or a family member of the owner.

The vehicle 30A includes a battery 32A. The vehicle 30B includes a battery 32B. The vehicle 30a includes a battery 32a. The vehicle 30b includes a battery 32b. The vehicle 30c includes a battery 32c. The vehicle 30d includes a battery 32d.

In the present embodiment, the plurality of vehicles including the vehicle 30A, the vehicle 30B, the vehicle 30a, the vehicle 30b, the vehicle 30c, and the vehicle 30d may be collectively referred to as a "vehicle 30". In addition, each user of the vehicle 30A and the vehicle 30B may be collectively referred to as a "user 70". In addition, each user of the vehicle 30a, the vehicle 30b, the vehicle 30c, and the vehicle 30d may be collectively referred to as a "user 80". In addition, the plurality of batteries including the battery 32A, the battery 32B, the battery 32a, the battery 32b, the battery 32c, and the battery 32d may be collectively referred to as a "battery 32".

Note that the battery 32 is an example of a driving power source included in the vehicle 30. The driving power source includes a power source that, like a fuel cell or the like, consumes a fuel to generate electric energy to be provided to a motive power source of the vehicle 30. The fuel may be hydrogen, a hydrocarbon fuel such as gasoline, light oil, and natural gas, an alcohol fuel, or the like. The driving power source may be any power source that can generate the electric energy to be provided to the motive power source of the vehicle 30.

The vehicle 30 is an example of a transportation device. The vehicle 30 is, for example, a vehicle including a motive power source driven by electric energy, such as an electric vehicle or a fuel cell vehicle (FCV). The electric vehicle includes a battery electric vehicle (BEV), a hybrid vehicle or a plug-in hybrid electric vehicle (PHEV) including an internal combustion engine to at least partially provide motive power. In the present embodiment, the vehicle 30 is an electric vehicle including the battery 32 as the driving power source. In a form in which a battery is adopted as the driving power source, battery discharge corresponds to energy release from the driving power source, and battery charge corresponds to energy accumulation in the driving power source. In addition, a remaining capacity of a battery corresponds to an amount of energy accumulated in the driving power source such as an amount of power or amount of electricity that can be supplied from the driving power source.

The user terminal 72a is a communication terminal used by the user 70a. The user terminal 72b is a communication terminal used by the user 70b. The user terminal 72a and the user terminal 72b may be collectively referred to as a "user terminal 72". Similarly, the user terminal 82a is a communication terminal used by the user 80a, the user terminal 82b is a communication terminal used by the user 80b, the user terminal 82c is a communication terminal used by the user 80c, and the user terminal 82d is a communication terminal used by the user 80d. The user terminal 82a, the user terminal 82b, the user terminal 82c, and the user terminal 82d may be collectively referred to as a "user terminal 82".

The user terminal 72 and the user terminal 82 may be, for example, mobile terminals, personal computers, vehicle navigation devices, or the like. As an example of the mobile terminal, a mobile phone, a smartphone, a PDA, a tablet, a notebook computer, a laptop computer, a wearable computer, or the like can be illustrated.

The management server 40 is capable of communicating with the vehicle 30, the stationary battery 14, the user terminal 72, and the user terminal 82 through a communication network. The management server 40 is also capable of communicating with a power trading server 50 through the communication network. The communication network can include transmission paths of a wired communication or a wireless communication. The communication network may include a communication network including the Internet, a P2P network, a dedicated line, a VPN, a power line communication line, a mobile phone line, or the like.

A power network 10 can include a power transmission system or a power distribution system of a power system, or a power distribution network of a power grid. The power network 10 may be provided for each region. The power network 10 may be a microgrid. The power network 10 may be a power distribution network of any scale that connects a power device which consumes power, and a power source. For example, the power network 10 may be a power distribution network provided to any facility such as a commercial facility. The power network 10 may be provided for each building. The vehicle 30, the stationary battery 14, a charging and discharging facility 20, and the power generation facility 12 are connected to the power network 10. The charging and discharging facility 20, the stationary battery 14, and the power generation facility 12 are capable of power transmission and reception to and from the power network 10.

The power generation facility 12 is managed by an electric power company or the like. The charging and discharging facility 20 includes, for example, a charger and discharger installed in a house, a charging and discharging station or the like, installed in a parking lot or a public space in an apartment house, a building, and a store. The charging and discharging facility 20 is an example of a power transmission and reception facility for performing the power transmission and reception between the vehicle 30 and the power network 10. In addition, the charging and discharging facility 20 and the stationary battery 14 are examples of an electric facility for accumulating energy in the driving power source of the vehicle 30.

The vehicle 30 is connected to the charging and discharging facility 20 through a charging and discharging cable 22. That is, the vehicle 30 is connected to the power network 10 through the charging and discharging cable 22 and the charging and discharging facility 20. The vehicle 30 performs the power transmission and reception between the battery 32 and the power network 10 through the charging and discharging facility 20. For example, the vehicle 30 releases the power, which is obtained by discharge of the battery 32, to the power network 10 via the charging and discharging cable 22 and the charging and discharging facility 20. In addition, the vehicle 30 charges the battery 32 with the power supplied from the power network 10 via the charging and discharging cable 22 and the charging and discharging facility 20. Note that the power transmission and reception to and from the power network 10 may be referred to as a "power transmission and reception with the power network 10" and the like.

The stationary battery 14 is managed by the power aggregator. The battery 32 of the vehicle 30 forms a virtual power plant along with the stationary battery 14. The management server 40 is managed by the power aggregator. The management server 40 controls the power transmission and reception between the battery 32 and the power network 10, and between the stationary battery 14 and the power network 10.

The management server 40 carries out power trading by bidding in a wholesale electricity market or a supply and demand balancing market. The power trading server 50 is managed by an operator of the wholesale electricity market or the supply and demand balancing market. For example, a length of each time segment as a time unit is defined as 30 minutes, and the management server 40 places a bid in the power trading server 50 in every time segment. The management server 40 causes the battery 32 and the stationary battery 14 to be discharged in each time segment based on a contract result to supply the power to the power network 10.

The management server 40 causes the battery 32 and the stationary battery 14 to be discharged, according to an amount of power agreed in trading for bidding of the power aggregator in the wholesale electricity market, to supply the power network 10 with the power released from the battery 32 and the stationary battery 14. In addition, the management server 40 controls charge and discharge of the battery 32 and the stationary battery 14, in a range of balancing power agreed in trading for bidding of the power aggregator in the supply and demand balancing market, to balance power supply and demand in the power network 10. For example, the management server 40 controls the charge and discharge of the battery 32 and the stationary battery 14 according to an increased demand response (increased DR), a decreased demand response (decreased DR), and an increased and decreased demand response (increased and decreased DR) requested by a power transmission and distribution company or a retail electricity supplier.

Specifically, the management server 40 controls at least one of the vehicle 30 and the charging and discharging facility 20 according to the increased DR to thereby charge the battery 32 of the vehicle 30 with the power received from the power network 10 through the charging and discharging facility 20. In addition, the management server 40 controls at least one of the vehicle 30 and the charging and discharging facility 20 according to the decreased DR to thereby cause the battery 32 of the vehicle 30 to be discharged, and cause the power obtained by the discharge of the battery 32 to be released toward the power network 10 through the charging and discharging facility 20.

In the present embodiment, each of the users 70 is associated with the particular user 80 in a manner of pre-association. The user 70, and the user 80 associated with the user 70 form one group that carries out V2G. The user 70 makes, on behalf of the group, an application for V2G to the aggregator.

For example, the user 70 recruits, in advance, the vehicle 30 which is predicted to be connected to the power network 10, from the users 80, and applies for V2G to the management server 40. For example, in a case where a power demand is predicted to be large during the next day, the user 70a calls for the user 80 who is in a friend relationship or the user 80 who is a colleague at work to participate in V2G. The user 80 provides a notification of participating in V2G in a case where the vehicle 30 is not scheduled to be used the next day, for example. In a case where the participation notifications were collected from the users 80 of 10 vehicles 30 or more by a predetermined time of the previous day, the user 70 specifies a time zone to apply for V2G to the management server 40 through the user terminal 72a. The management server 40 accepts the application from the user 70 taking account of an amount of power that has been procured by the power aggregator, a trading price in the wholesale electricity market, or the like.

When accepting the application from the user 70, the management server 40 causes the power transmission to be carried out, in the specified time zone of the next day, from the vehicle 30 of the user 80 or the user 70 itself to the power network 10. When a predetermined number or more vehicles 30 are connected to the charging and discharging facilities 20 in the specified time zone, among the vehicles 30 of the user 80 who is associated with the user 70, and the vehicle 30 of the user 70 itself, the management server 40 gives the user 70 a consideration such as a point. The consideration given to the user 70 can be an incentive for the user 70 to work on another user 80 to have the vehicle 30 connected to the charging and discharging facility 20.

With the power transmission and reception system 100, each of the users 70 applies for V2G collectively with the plurality of vehicles 30, and thus the management server 40 is capable of using a large number of vehicles 30 for V2G by interacting with a small number of users 70. Accordingly, a large number of vehicles 30 can be managed without interacting with a large number of users 80.

Note that in the present embodiment, the power transmission and reception means that passing of the power occurs between the vehicle 30 and the power network 10 at least from one to the other. For example, the power transmission and reception may mean that the release of the power is performed from the vehicle 30 toward the power network 10. The power transmission and reception may also mean that the power transmission is performed from the power network 10 toward the vehicle 30. Note that in a case where the vehicle 30 releases the power through the charger and discharger installed at a power consumer such as a home of the user, when power consumption on a power consumer's side is greater than the power released from the vehicle 30, a net power supply to the power network 10 does not occur at a connection point between the power consumer's side and the power network 10, and the amount of power supply from the connection point to the power consumer simply decreases, in some cases. In this case as well, it can be considered that the passing of the power to and from an outside of the power network 10 has occurred from the viewpoint of the power network 10. Accordingly, it does not matter in the present embodiment whether or not the power network 10 receives net power from a particular connection point between the power network 10 and the vehicle 30, in the power transmission and reception with the power network 10 when the vehicle 30 releases the power.

Figure 2:
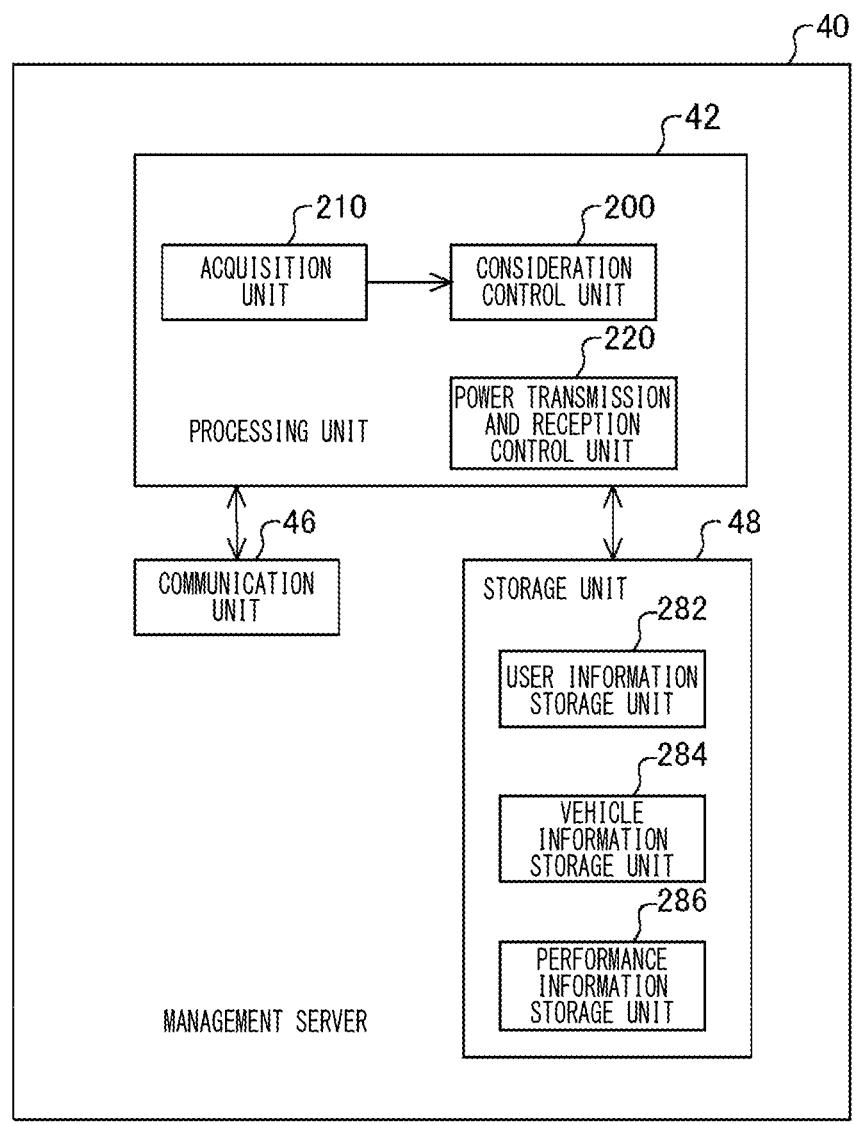
FIG. 2 schematically shows a functional configuration of a management server 40.

FIG. 2 schematically shows a functional configuration of a management server 40. The management server 40 functions as a power transmission and reception management device. The management server 40 includes a processing unit 42, a storage unit 48, and a communication unit 46. The processing unit 42 is realized by a processing device including a processor. The storage unit 48 is realized by a non-volatile storage device. The communication unit 46 is responsible for communicating with the vehicle 30, the stationary battery 14, the user terminal 72, and the power trading server 50. Information received by the communication unit 46 from the vehicle 30, the stationary battery 14, the user terminal 72, and the power trading server 50 is supplied to the processing unit 42. In addition, information to be transmitted to the vehicle 30, the stationary battery 14, the user terminal 72, and the power trading server 50 is generated by the processing unit 42, and is transmitted via the communication unit 46.

The processing unit 42 includes an acquisition unit 210, a consideration control unit 200, and a power transmission and reception control unit 220. The storage unit 48 includes a user information storage unit 282, a vehicle information storage unit 284, and a performance information storage unit 286.

The user information storage unit 282 stores information indicating correspondences between the user 70 and the plurality of users 80. The vehicle information storage unit 284 stores information indicating correspondences between the plurality of users 80 and the plurality of vehicles 30 including the batteries. The acquisition unit 210 acquires, from the user 70, schedule information indicating a scheduled period during which at least a part of the plurality of vehicles 30 are available for power transmission and reception with the power network 10. The consideration control unit 200 associates, with the user 70, consideration information indicating a consideration to be provided to the user 70 when at least a part of the plurality of vehicles 30 are available for power transmission and reception with the power network 10 during the scheduled period.

For example, the consideration control unit 200 associates the consideration information with identification information of the user 70, and stores the associated information in the storage unit 48. The consideration is, for example, the point. The consideration may represent a monetary value. The consideration may represent a variety of values other than the monetary value. With the power transmission and reception system 100, the consideration provided to the user 70 can be an incentive for the user 70 to work on another user 80 to have the vehicle 30 connected to the power network 10. Note that the user 70 is an example of a first user, and the user 80 is an example of a second user.

The power transmission and reception control unit 220 causes the vehicle 30 that is available for power transmission and reception with the power network 10, among the plurality of vehicles 30, to perform the power transmission and reception to and from the power network 10 according to the power demand of the power network 10 during the scheduled period. For example, the power transmission and reception control unit 220 instructs a charging and discharging ECU of the vehicle 30 to perform the charge and discharge of the battery 32. The charging and discharging ECU of the vehicle 30 communicates with the charging and discharging facility 20 according to the instruction of the power transmission and reception control unit 220, and controls a power converter of the vehicle 30 to perform the charge of the battery 32 through the charging and discharging facility 20, or the release of the power obtained by the discharge of the battery 32. Note that the power transmission and reception control unit 220 may successively acquire, from the charging and discharging ECU of the vehicle 30, information indicating: an amount of power input from the charging and discharging facility 20 to the power converter at the time of charging the battery 32; an amount of power output from the power converter to the charging and discharging facility 20 at the time of discharging the battery 32; and an SOC (State of Charge) of the battery 32. The power transmission and reception control unit 220 may control the power transmission and reception between the vehicle 30 and the power network 10 based on the information acquired from the charging and discharging ECU of the vehicle 30.

The schedule information includes the identification information of the vehicle 30 that is available for power transmission and reception with the power network 10 during the scheduled period, among the plurality of vehicles 30. The acquisition unit 210 may accept the schedule information on condition that the number of the vehicles 30 that are available for power transmission and reception with the power network 10 is greater than or equal to a predetermined value. The acquisition unit 210 may accept the schedule information on condition that a total value of power that is available for power transmission and reception between the vehicles 30 which are available for power transmission and reception with the power network 10, is greater than or equal to a predetermined value.

The vehicle information storage unit 284 stores power transmission and reception information indicating an amount of power that is available for power transmission and reception between each of the plurality of vehicles 30 and the power network 10. The acquisition unit 210 specifies the total value of the power that is available for power transmission and reception based on the power transmission and reception information.

The performance information storage unit 286 associates, with the user 70, performance information indicating whether the plurality of vehicles 30 were available for power transmission and reception to and from the power network 10 during the scheduled period, and stores the associated information. Power transmission and reception ability information indicating whether the vehicle 30 is available for power transmission and reception to and from the power network 10 may be transmitted periodically from the charging and discharging ECU of the vehicle 30 to the management server 40. The management server 40 may update the performance information storage unit 286 based on the power transmission and reception ability information received from the charging and discharging ECU of the vehicle 30. The acquisition unit 210 may determine whether to accept new schedule information from the user 70 based on the performance information. The consideration control unit 200 may associate, with the user 70, the consideration information in accordance with the performance information.

The consideration control unit 200 may associate, with the user 70, the consideration information in accordance with the number of the vehicles 30 that are available for power transmission and reception with the power network 10 during the scheduled period, among the plurality of vehicles 30. For example, the consideration control unit 200 may associate, with the user 70, the consideration information on condition that the number of the vehicles 30 which are available for power transmission and reception with the power network 10 during the scheduled period, among the plurality of vehicles 30, is greater than or equal to a predetermined value.

The consideration control unit 200 may associate, with the user 70, the consideration information in accordance with the total value of the power that is available for power transmission and reception between the vehicles 30 which are available for power transmission and reception with the power network 10 during the scheduled period, among the plurality of vehicles 30, and the power network 10. For example, the consideration control unit 200 may associate, with the user 70, the consideration information on condition that the total value of the power that is available for power transmission and reception between the vehicles 30 which are available for power transmission and reception with the power network 10 during the scheduled period, among the plurality of vehicles 30, and the power network 10 is greater than or equal to a predetermined value.

With the management server 40, it is possible to work on a large number of vehicles 30 to be in a state ready for V2G without directly interacting with a large number of users 80. Therefore, the power aggregator can ensure a V2G capacity by the vehicle 30 while reducing management cost of the user.

Note that a function of the power transmission and reception management device may be realized by the management server 40 alone or may be realized by a combination of the management server 40 and the ECU of the vehicle 30. For example, at least some of processes executed by the management server 40 may be executed by the ECU of the vehicle 30. For example, at least some of the functions realized by the acquisition unit 210, the consideration control unit 200, the power transmission and reception control unit 220, the user information storage unit 282, the vehicle information storage unit 284, and the performance information storage unit 286 may be realized by the ECU of the vehicle 30.

FIG. 3 shows an example of user information showing correspondence between a user 70 and a user 80 in a table format. The user information is stored in the user information storage unit 282 in the storage unit 48. In the user information, a primary user ID and a secondary user ID are associated. As the main user ID, the identification information of the user 70 applying for V2G is stored. As the secondary user ID, the identification information of the user 80 which is associated with the user 70 is stored.

The user 70 and the user 80 may be, for example, registered as users of a member's website operated by the power aggregator. The member's website operated by the power aggregator may have a function for the users of the web site to form a group and communicate with each other.

The user 70 may be, for example, an organizer of the group, and the user 80 may be a participant in the group. In the user information storage unit 282, the identification information of the organizer of the group may be stored as the main user ID, and the identification information of the participant in the group may be stored as the secondary user ID. The user information storage unit 282 may associate and store the main user ID and the secondary user ID with reference to a friend relationship in another SNS (social networking service).

FIG. 4 shows an example of vehicle information showing correspondence between the user 70, the user 80, and a vehicle 30 in a table format. The vehicle information is stored in the vehicle information storage unit 284 in the storage unit 48. In the vehicle information, a user ID, a vehicle ID, and an upper limit power for charging and discharging are associated.

As the user ID, the identification information of each of the user 70 and the user 80 is stored. As the vehicle ID, the identification information of the vehicle 30 is stored.

As the upper limit power for charging and discharging, a maximum value of the power that the vehicle 30 is capable of charging and discharging is stored. The information stored as the upper limit power for charging and discharging is an example of the power transmission and reception information indicating the power that is available for power transmission and reception between the vehicle 30 and the power network 10. The upper limit power for charging and discharging may be, for example, set based on a performance of the power converter of battery 32 of the vehicle 30. The upper limit power for charging and discharging may be set based on the charging and discharging environment of the user 70 or the user 80 such as performances of a charging and discharging device at home of the user 70 or the user 80, and the charger and discharger used by the user 70 or the user 80 to charge and discharge the vehicle 30 at work.

Note that the number of the vehicles 30 respectively associated with the user 70 and the user 80 in the vehicle information is not limited to one. The plurality of vehicles 30 may be associated with one user of the user 70 and the user 80. For example, when an operator of a used car dealership is the user 70 or the user 80, the operator of the used car dealership may be associated with the vehicle 30 for sale at the used car dealer. In addition, when an operator of a parking lot is the user 70 or the user 80, the operator of the parking lot may be associated, in the vehicle information, with the vehicle 30 to a contract of use of the parking lot.

FIG. 5 shows an example of schedule information of V2G in a table format. The schedule information is stored in the storage unit 48. The schedule information is generated by the user 70 using the user terminal 72 to register a schedule for V2G in the member's website of the power aggregator. In the schedule information, a schedule ID, the primary user ID, a start time, an end time, and a status are associated.

The schedule ID is the identification information that is given, by the management server 40, to each of the schedules registered by the user 70. As the primary user ID, the identification information of the user 70 who has registered the schedule is stored. As the start time, the start time of the scheduled period during which V2G is performed is stored. As the end time, the end time of the scheduled period during which V2G is performed is stored.

The status indicates the status of the schedule information. "Recruiting" indicates that the user 80 is being recruited, and "approval" indicates that the application for V2G by user 70 has been accepted by the management server 40.

FIG. 6 shows an example of participation information showing a person scheduled to participate in V2G in a table format. The participation information is stored in the storage unit 48. In the participation information, the schedule ID and a participant ID are associated. As the participant ID, the identification information of the user 70 and the user 80 is stored. The participation information is generated by the user 80 performing, through the member's website, an operation to participate in V2G during the scheduled period registered by the user 70.

FIG. 7 shows an example of connection history information showing a connection history of the vehicle 30 to a power network 10 in a table format. The connection history information is stored in the storage unit 48. In the connection history information, the vehicle ID, a connection start time, a connection end time, and an amount of power transmission and reception are associated.

As the vehicle ID, the identification information of the vehicle 30 is stored. As the connection start time, a time when the vehicle 30 becomes available for power transmission and reception to and from the power network 10 is stored. The connection start time may be specified based on the power transmission and reception ability information that is periodically transmitted from the charging and discharging ECU of the vehicle 30 to the management server 40. As the connection start time, the time when the power transmission and reception control unit 220 becomes capable of controlling the charge and discharge of the battery 32, after the charging and discharging cable 22 is attached to the vehicle 30 and the charging and discharging facility 20, may be stored.

As the connection end time, a time when the power transmission and reception between the vehicle 30 and the power network 10 becomes not available is stored. The connection end time may be specified based on the power transmission and reception ability information that is periodically transmitted from the charging and discharging ECU of the vehicle 30 to the management server 40. As the connection end time, an end time of a period during which the vehicle 30 is connected to the charging and discharging facility 20 through the charging and discharging cable 22 may be stored. As the connection end time, a time when a power cable is removed from at least one of the vehicle 30 and the charging and discharging facility 20 may be stored. As the connection end time, the time when the power transmission and reception control unit 220 becomes incapable of controlling the charge and discharge of the battery 32 may be stored.

As the amount of power transmission and reception, a net amount of power transmission and reception between the vehicle 30 and the power network 10 from the connection start time to the connection end time is stored. The consideration control unit 200 generates information of an amount of money to be paid to the user 70 or the user 80 of each of the vehicles 30 based on the amount of power transmission and reception by each of the vehicles 30, and stores the generated information in the storage unit 48. The amount of money to be paid to the user 70 or the user 80 is calculated according to the amount of power transmission and reception. When the net amount of power from the vehicle 30 to the power network 10 is positive, the consideration control unit 200 calculates the amount of payment to the user 70 and the user 80 based on the amount of power transmission and reception and a buying unit price. When the net amount of power is negative, the consideration control unit 200 calculates a billing amount to the user 70 or the user 80 based on the amount of power transmission and reception and a selling unit price. The buying unit price is a price per unit of electricity that the power aggregator buys from the user 70 and the user 80. The selling unit price is a price per unit of electricity that the power aggregator sells to the user 70 and the user 80.

The consideration control unit 200 may determine the buying unit price to be applied when the power is bought from the user 70 or the user 80, and the selling unit price to be applied when the power is sold to the user 70 or the user 80, according to the number of the vehicles 30 that are available for power transmission and reception with the power network 10 during the scheduled period, or a total value of the upper limit power for charging and discharging of the vehicles 30 that are available for power transmission and reception with the power network 10 during the scheduled period. For example, as the number of the vehicles 30 that are available for power transmission and reception with the power network 10 during the scheduled period increases, the consideration control unit 200 may raise the buying unit price and reduce the selling unit price. As the total value of the upper limit power for charging and discharging of the vehicles 30 that are available for power transmission and reception with the power network 10 during the scheduled period increases, the consideration control unit 200 may raise the buying unit price and reduce the selling unit price. This can be an incentive to encourage the user 80 to participate in V2G and connect the vehicle 30 to the power network 10, in addition to the user 70 who collectively organizes the participation in V2G.

Note that the connection history information may be stored in any format as long as the connection history information can specify whether the vehicle 30 was in a state of being available for power transmission and reception to and from the power network 10, regardless of whether the vehicle 30 actually transmitted and received the power to and from the power network 10. The consideration control unit 200 can specify whether the vehicle 30 of the user 80 associated with the user 70 was in a state of being available for power transmission and reception to and from the power network 10, during the scheduled period of V2G associated with the "approval" status in the schedule information, with reference to the connection history information, the participation information, and the schedule information. Therefore, the connection history information, the participation information, and the schedule information can function as the performance information stored in the performance information storage unit 286.

FIG. 8 shows an example of consideration information provided by a consideration control unit 200 in a table format. The consideration information is stored in the storage unit 48. In the consideration information, the user ID, current points, and total points are associated.

As the user ID, the identification information of the user 70 is stored. As the current points, the current points provided to the user 70 are stored.

As the total points, a total value of the points having been provided to the user 70 until the current time is stored. As the total points, a total value of the points having been provided to the user 70 during a period between a time point which is predetermined length of time prior to the current time, and the current time may be stored. In a case where the vehicle 30 associated with the schedule is connected to the charging and discharging facility 20 during the scheduled period of V2G approved for the user 70, the consideration control unit 200 adds the points provided to the user 70.

The total points can be used as an expected value for the user 80 associated with the user 70 to properly connect the vehicle 30 to the charging and discharging facility 20 during the scheduled period of V2G. The total points are used as reliability information of the user 70. For example, the management server 40 may prioritize approving the application of the user 70 having high total points.

Note that in the power transmission and reception system 100, in a case of using the stationary battery 14 at the time of emergency, the user 70 can use the points provided to the user 70. For example, when the current points of the user 70 are greater than or equal to a predetermined value, and the remaining capacity of the vehicle 30 of the user 70 is lower than a predetermined value, the consideration control unit 200 permits the charge of the battery 32 of the vehicle 30 with the stationary battery 14, in exchange for subtraction of predetermined points from the current points provided to the user 70. In addition, the processing unit 42 prioritizes permitting the user 70 having high current points or past total points, over other users, to charge the battery 32 of the vehicle 30 at the time of disaster or the like.

When the current points of the user 70 are greater than or equal to a predetermined value, and the remaining capacity of the vehicle 30 of the user 70 is lower than a predetermined value, the consideration control unit 200 permits the charge of the battery 32 of the vehicle 30 with the stationary battery 14, in exchange for subtraction of predetermined points from the current points given to the user 70. The consideration control unit 200 may permit the battery 32 of the vehicle 30 to be charged with the stationary battery 14 at the time of disaster as a further condition.

Figure 9:
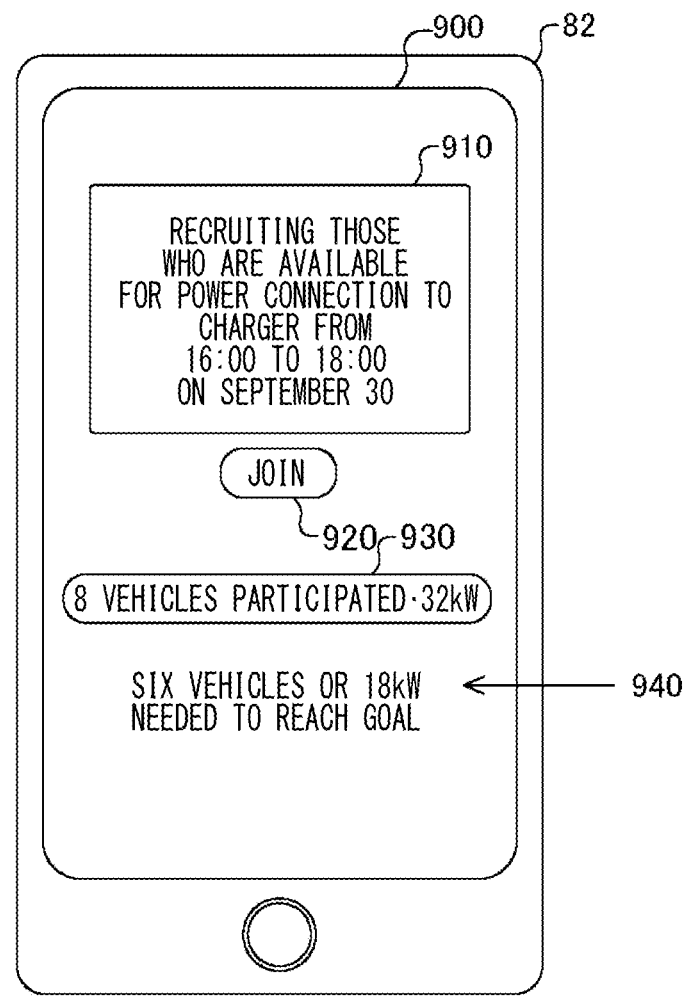
FIG. 9 shows an example of a screen 900 for recruiting the user 80 to participate in V2G.

FIG. 9 shows an example of a screen 900 for recruiting the user 80 to participate in V2G. When the user 80 accesses the member's website of the power aggregator by using the user terminal 82, the user terminal 82 receives V2G information associated with the user 80 from the management server 40, and the screen 900 is generated.

For example, when the user terminal 82 transmits the identification information of the user 80 to the management server 40, the management server 40 identifies the user 70 associated with the user 80, based on the received identification information of the user 80 and the user information of the user information storage unit 282, and transmits the V2G information for generating the screen 900 to the user terminal 82, based on the V2G schedule information which is registered by the identified user 70, the participation information associated with the schedule information, and the vehicle information.

The user terminal 82 displays the screen 900 based on the V2G information received from the management server 40. The screen 900 includes a message field 910, a join button 920, a participation information button 930, and an application condition object 940.

In the message field 910, a message from the user 70 to the user 80 is displayed. The message in the message field 910 is set when the user 70 registers the schedule information in the member's website of the power aggregator.

The join button 920 is a button for the user 80 to register for the participation in V2G. When the user 80 presses the join button 920, the user terminal 82 transmits, to the management server 40, the identification information of the user 80 along with the schedule ID that is included in the V2G information. The management server 40 associates the received identification information of the user 80 with the received schedule ID, and stores the associated information in the participation information shown in FIG. 6.

For the participation information button 930, the number of the vehicles 30 of the user 70 and the user 80 associated with the schedule ID in the participation information, and the total value of the upper limit power for charging and discharging of the vehicles 30 are included. When the participation information button 930 is pressed, the user terminal 82 displays a list of the users 80 associated with the schedule ID.

The application condition object 940 is an object indicating a condition that the user 70 should meet to apply for V2G to the management server 40. As described below, it is possible to apply for V2G when the total value of the upper limit power for charging and discharging of the vehicles 30 of the participants in V2G, or the number of the vehicles 30 of the participants in V2G respectively meet predetermined conditions. As a condition on which it is possible to apply for V2G, a condition that the total value of the upper limit power for charging and discharging of the vehicles 30 of the participants is 50 kW or higher or that the number of the vehicles 30 of the participants is 10 or more, or the like may be applied.

Figure 10:
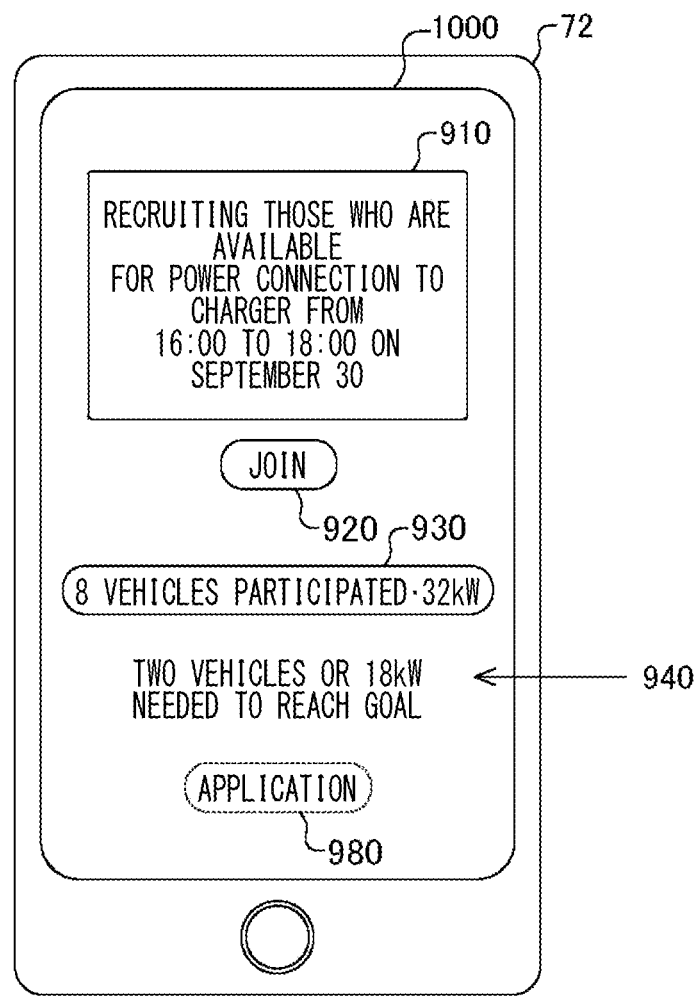
FIG. 10 shows an example of a screen 1000 presented to the user 70.

FIG. 10 shows an example of a screen 1000 presented to the user 70. When the user 70 accesses the member's website of the power aggregator by using the user terminal 72, the user terminal 72 receives the V2G information associated with the user 70 from the management server 40, and the screen 1000 is generated.

For example, when the user terminal 72 transmits the identification information of the user 70 to the management server 40, the management server 40 transmits the V2G information for generating the screen 1000 to the user terminal 72 based on the V2G schedule information which is registered by the user 70 identified based on the received identification information, the participation information associated with the schedule information, and the vehicle information.

The user terminal 72 displays the screen 1000 based on the V2G information received from the management server 40. The screen 1000 includes the message field 910, the join button 920, the participation information button 930, the application condition object 940, and an application button 980. Each object in the message field 910, the join button 920, the participation information button 930, and the application condition object 940 is the same as the object with the same reference in FIG. 9. In the screen 1000, the join button 920 is used as a button for the user 70 itself to participate in V2G.

The application button 980 is a button for the user 70 to apply for V2G to the management server 40. The application button 980 is activated on condition that the number of the vehicles 30 of the user 80 and the user 70 participating in V2G is greater than or equal to a predetermined value or that the total value of the upper limit power for charging and discharging of the vehicles 30 of the user 80 and the user 70 participating in V2G is greater than or equal to a predetermined value. The activation of the application button 980 brings about a state in which the application operation of the user 80 in the user terminal 72 can be accepted.

When the user 70 presses the application button 980, the user terminal 72 transmits the identification information of the user 70 and the schedule ID to the management server 40. The acquisition unit 210 determines whether to accept the application based on the information of the vehicle 30 to perform V2G, the number of the users 80 and the users 70 participating in V2G, the reliability information of the user 70, and the power demand in the power network 10 predicted during the scheduled period of V2G, or the like, based on the identification information of the user 70 and the schedule ID that are received from the user terminal 72. For example, the acquisition unit 210 calculates an evaluation value to evaluate an approval value by using, as parameters, the total value of the upper limit power for charging and discharging of the vehicles 30 participating in V2G, the number of the users 80 and the users 70 participating in V2G, the reliability information of the user 70, and a predicted value of the power demand in the power network 10. The acquisition unit 210 may calculate the evaluation value by adding each parameter with a predetermined weighting factor. The acquisition unit 210 may accept the applications on condition that the evaluation value is greater than or equal to a predetermined value.

Figure 11:
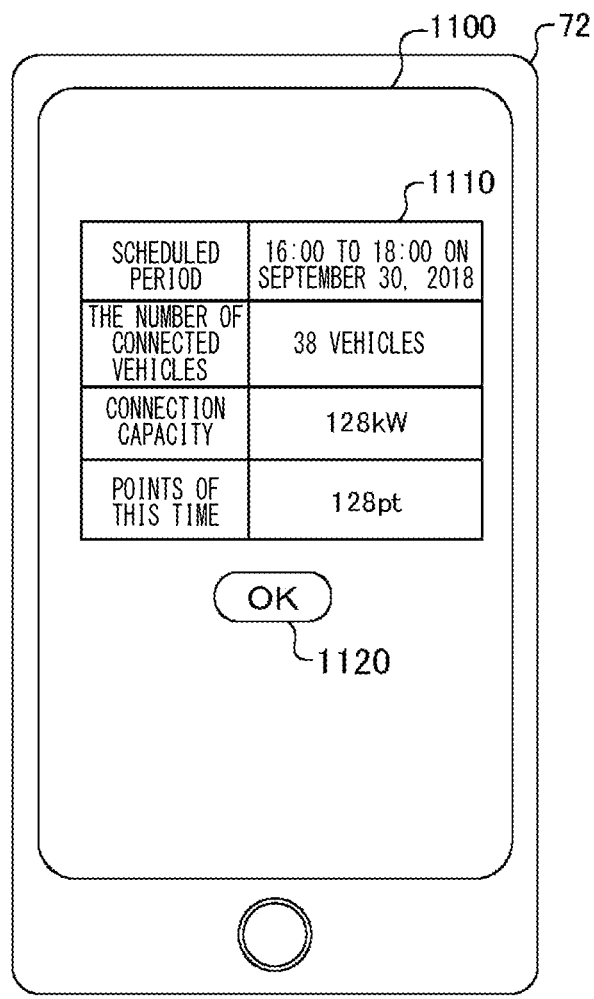
FIG. 11 shows an example of a screen 1100 showing a result of a participation in V2G.

FIG. 11 shows an example of a screen 1100 showing a result of a participation in V2G. The user terminal 72 of the user 70 accesses the member's website of the power aggregator, transmits the identification information of the user 70, and requests, to the management server 40, information indicating a connection result of the vehicle 30 associated with the user 70.

The management server 40 generates information to generate the screen 1100 with reference to reservation information, the participation information, the connection history information, and the vehicle information, based on the received identification information of the user 70, and transmits the generated information to the user terminal 72. The screen 1100 includes a result object 1110 which shows the connection result of the vehicle 30, and a button 1120 to close the screen 1100.

The connection result object 1110 includes the scheduled period of V2G, the number of connected vehicles, connection capacity, and point information of this time. The scheduled period indicates the start time and end time included in the reservation information. The number of the connected vehicles indicates the number of the vehicles 30 connected to the charging and discharging facilities 20 over the scheduled period, among the vehicles 30 of the users 80 associated with the user 70. The number of the connected vehicles is specified based on the schedule information and the connection history information.

The connection capacity shows the total value of the upper limit power for charging and discharging of the vehicles 30 connected to the charging and discharging facilities 20 over the scheduled period. The connection capacity is generated based on the schedule information, the connection history information, and the vehicle information. The number of the connected vehicles, and the connection capacity are specified based on whether the vehicle 30 is connected to the charging and discharging facility 20 over the scheduled period, regardless of whether the vehicle 30 actually performs the power transmission and reception to and from the power network 10.

Points of this time indicate points provided to the user 70 for V2G. The consideration control unit 200 may determine the points of this time based on the connection capacity. The consideration control unit 200 may determine the points of this time based on the connection capacity and the number of the connected vehicles. The consideration control unit 200 may determine the points of this time in proportion to at least one of the connection capacity and the number of the connected vehicles.

As described above, with the power transmission and reception system 100, each of the users 70 applies for V2G collectively with the plurality of vehicles 30, and thus the management server 40 can manage a large number of vehicles 30 without directly interacting with a large number of the users 80. Therefore, the power aggregator can ensure a V2G capacity by the vehicle 30 while reducing management cost of the user.

Figure 12:
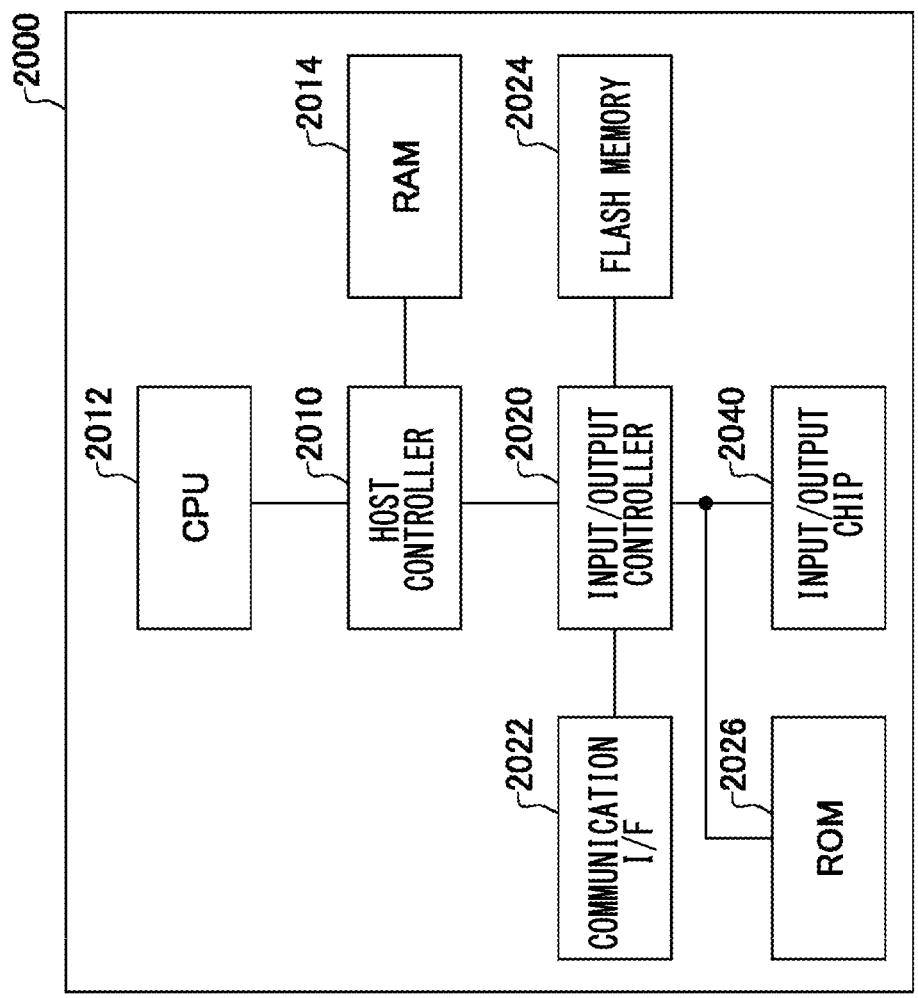
FIG. 12 shows an example of a computer 2000 in which a plurality of embodiments of the present invention can be embodied entirely or partially.

FIG. 12 shows an example of a computer 2000 in which a plurality of embodiments of the present invention can be embodied entirely or partially. A program installed on the computer 2000 can cause the computer 2000 to function as a device such as the management server 40 or each unit of the device according to the embodiment, or cause the computer 2000 to execute an operation associated with the device or each unit of the device, and/or cause the computer 2000 to execute a process or steps of the process according to the above embodiment. Such a program may be executed by a CPU 2012 to cause the computer 2000 to execute the specific operation associated with some or all of the blocks of the processing procedures and block diagrams described in the present specification.

The computer 2000 according to the present embodiment includes the CPU 2012 and a RAM 2014, which are interconnected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to programs stored in the ROM 2026 and the RAM 2014, thereby controlling each unit.

The communication interface 2022 performs communication with other electronic devices via a network. The flash memory 2024 stores programs and data used by the CPU 2012 in the computer 2000. The ROM 2026 stores therein a boot program or the like that is performed by the computer 2000 at the time of activation, and/or a program depending on the hardware of the computer 2000. The input/output chip 2040 may also connect various input/output units such as a keyboard, a mouse, and a monitor to the input/output controller 2020 via an input/output port such as a serial port, a parallel port, a keyboard port, a mouse port, a monitor port, a USB port, an HDMI (registered trademark) port.

A program is provided via a computer-readable medium such as a CD-ROM, a DVD-ROM, or a memory card, or a network. The RAM 2014, the ROM 2026, or the flash memory 2024 is an example of the computer-readable medium. The program is installed in the flash memory 2024, the RAM 2014, or the ROM 2026, and is executed by the CPU 2012. Information processing written in these programs is read by the computer 2000, resulting in cooperation between a program and the above-mentioned various types of hardware resources. A device or a method may be configured by implementing the operation or process of the information according to the use of the computer 2000.

For example, when a communication is executed between the computer 2000 and an external device, the CPU 2012 may execute a communication program loaded in the RAM 2014, and instruct the communication interface 2022 to process the communication based on the process written in the communication program. Under the control of the CPU 2012, the communication interface 2022 reads transmission data stored in a transmission buffer region provided in a recording medium such as the RAM 2014 and the flash memory 2024, transmits the read transmission data to the network, or writes received data which is received from the network to a receiving buffer region or the like provided on the recording medium.

Further, the CPU 2012 may execute various types of processes on the data on the RAM 2014 such that the RAM 2014 reads all or necessary parts of a file or database stored in the recording medium such as the flash memory 2024. The CPU 2012 then writes back the processed data to the recording medium.

Various types of information, such as various types of programs, data, tables, and databases, may be stored in the recording medium to undergo information processing. The CPU 2012 may execute various types of processing on the data read from the RAM 2014 to write back a result to the RAM 2014, the processing being described in the present specification, specified by an instruction sequence of the programs, and including various types of operations, processing of information, condition determinations, conditional branch, unconditional branch, information retrievals/replacements, or the like. In addition, the CPU 2012 may search for information in a file, a database, etc., in the recording medium. For example, when a plurality of entries, each having an attribute value of a first attribute associated with an attribute value of a second attribute, are stored in the recording medium, the CPU 2012 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-described program or software modules may be stored in the computer-readable media on the computer 2000 or near the computer 2000. A recording medium such as a hard disk or a RAM provided in a server system connected to a dedicated communication network or the Internet can be used as a computer-readable medium. The program stored on the computer-readable medium may be provided to the computer 2000 via a network.

The program, which is installed on the computer 2000 and causes the computer 2000 to function as the management server 40, may work on the CPU 2012 or the like to cause the computer 2000 to function as each unit of the management server 40. Information processing written in these programs functions, by being read by the computer 2000, as specific means by which software and the above-mentioned various hardware resources cooperate, and which are the acquisition unit 210, the consideration control unit 200, and the power transmission and reception control unit 220. Then, by the specific means realizing calculation or processing of information according to a purpose of use of the computer 2000 in the present embodiment, the unique management server 40 according to the purpose of use is constructed.

Various embodiments have been described with reference to the block diagrams or the like. Blocks in the block diagrams may represent (1) steps of processes in which operations are performed or (2) units of apparatuses responsible for performing operations. Certain steps and units may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), and the like.

Computer-readable media may include any tangible device that can store instructions for execution by a suitable device, so that the computer-readable medium having instructions stored therein comprises at least part of an article of manufacture including instructions which can be executed to create means for performing operations specified in the processing procedures or block diagrams. Examples of computer-readable media may include an electronic storage medium, a magnetic storage medium, an optical storage medium, an electromagnetic storage medium, a semiconductor storage medium, etc. More specific examples of computer-readable media may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a Blu-ray (registered trademark) disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk (registered trademark), JAVA (registered trademark), C++, etc., and conventional procedural programming languages, such as the "C" programming language or similar programming languages.

Computer-readable instructions may be provided to a processor of a general-purpose computer, special purpose computer, or other programmable data processing device, or to programmable circuitry, locally or via a local area network (LAN), wide area network (WAN) such as the Internet, etc., to execute the computer-readable instructions to create means for performing operations specified in the described processing procedures or block diagrams. Examples of processors include computer processors, processing units, microprocessors, digital signal processors, controllers, microcontrollers, etc.

While the embodiments of the present invention have been described, the technical scope of the invention is not limited to the above-described embodiments. It is apparent to persons skilled in the art that various alterations and improvements can be added to the above-described embodiments. Further, to the extent that there is no technical contradiction, the matters described for the specific embodiment can be applied to other embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10 power network; 12 power generation facility; 14 stationary battery; 20 charging and discharging facility; 22 charging and discharging cable; 30 vehicle; 32 battery; 40 management server; 42 processing unit; 46 communication unit; 48 storage unit; 50 power trading server; 70 user 72 user terminal; 80 user; 82 user terminal; 100 power transmission and reception system; 200 consideration control unit; 210 acquisition unit; 220 power transmission and reception control unit; 282 user information storage unit; 284 vehicle information storage unit; 286 performance information storage unit; 900 screen; 910 message field; 920 join button; 930 participation information button; 940 application condition object 980 application button 1000 screen; 1100 screen; 1110 result object; 1120 button; 2000 computer; 2010 host controller; 2012 CPU; 2014 RAM; 2020 input/output controller; 2022 communication interface; 2024 flash memory; 2026 ROM; 2040 input/output chip

What is claimed is:

1. A power transmission and reception management device comprising:
    at least one processor;
    at least one memory;
    a user information storage unit configured to store, in the at least one memory, information indicating correspondences between a first user and a plurality of second users;
    a vehicle information storage unit configured to store, in the at least one memory, information indicating correspondences between the plurality of second users, and a plurality of vehicles that include driving power sources;
    an acquisition unit configured to acquire, using the at least one processor, from the first user, schedule information indicating a scheduled period during which at least a part of the plurality of vehicles are available for power transmission and reception with a power network;
    a consideration control unit configured to associate, using the at least one processor, with the first user, consideration information indicating a consideration to be provided to the first user when at least a part of the plurality of vehicles are available for power transmission and reception with the power network during the scheduled period; and
    a power transmission and reception control unit configured to cause, using the at least one processor, a vehicle that is available for power transmission and reception with the power network, among the plurality of vehicles, to perform the power transmission and reception to and from the power network according to a power demand of the power network during the scheduled period.

2. The power transmission and reception management device according to claim 1,
    wherein the schedule information includes identification information of the vehicle that is available for power transmission and reception with the power network during the scheduled period, among the plurality of vehicles.

3. The power transmission and reception management device according to claim 2,
    wherein the acquisition unit is configured to accept, using the at least one processor, the schedule information on condition that a number of the vehicles that are available for power transmission and reception with the power network is greater than or equal to a predetermined value.

4. The power transmission and reception management device according to claim 3,
    wherein the acquisition unit is configured to accept, using the at least one processor, the schedule information on condition that a total value of power that is available for power transmission and reception between the vehicles which are available for power transmission and reception with the power network, and the power network, is greater than or equal to a predetermined value.

5. The power transmission and reception management device according to claim 4, wherein
the vehicle information storage unit is configured to store, in the at least one memory, power transmission and reception information indicating an amount of power that is available for power transmission and reception between each of the plurality of vehicles and the power network, and
the acquisition unit is configured to specify, using the at least one processor, the total value of the power that is available for power transmission and reception based on the power transmission and reception information.

6. The power transmission and reception management device according to claim 2,
wherein the acquisition unit is configured to accept, using the at least one processor, the schedule information on condition that a total value of power that is available for power transmission and reception between the vehicles which are available for power transmission and reception with the power network, and the power network, is greater than or equal to a predetermined value.

7. The power transmission and reception management device according to claim 6, wherein
the vehicle information storage unit is configured to store, in the at least one memory, power transmission and reception information indicating an amount of power that is available for power transmission and reception between each of the plurality of vehicles and the power network, and
the acquisition unit is configured to specify, using the at least one processor, the total value of the power that is available for power transmission and reception based on the power transmission and reception information.

8. The power transmission and reception management device according to claim 1, comprising:
a performance information storage unit configured to associate, with the first user, performance information indicating whether the plurality of vehicles were available for power transmission and reception to and from the power network during the scheduled period, and store associated information in the at least one memory,
wherein the acquisition unit is configured to determine, using the at least one processor, whether to accept new schedule information from the first user based on the performance information.

9. The power transmission and reception management device according to claim 1,
wherein the consideration control unit is configured to associate, using the at least one processor, with the first user, the consideration information in accordance with a number of the vehicles that are available for power transmission and reception with the power network during the scheduled period, among the plurality of vehicles.

10. The power transmission and reception management device according to claim 1,
wherein the consideration control unit is configured to associate, using the at least one processor, with the first user, the consideration information on condition that a number of the vehicles which are available for power transmission and reception with the power network during the scheduled period, among the plurality of vehicles, is greater than or equal to a predetermined value.

11. The power transmission and reception management device according to claim 1,
wherein the consideration control unit is configured to associate, using the at least one processor, with the first user, the consideration information in accordance with a total value of power that is available for power transmission and reception between the vehicles which are available for power transmission and reception with the power network during the scheduled period, among the plurality of vehicles, and the power network.

12. The power transmission and reception management device according to claim 1,
wherein the consideration control unit is configured to associate, using the at least one processor, with the first user, the consideration information on condition that a total value of power that is available for power transmission and reception between the vehicles which are available for power transmission and reception with the power network during the scheduled period, among the plurality of vehicles, and the power network is greater than or equal to a predetermined value.

13. The power transmission and reception management device according to claim 1, comprising:
a performance information storage unit configured to associate, with the first user, performance information indicating whether the plurality of vehicles were available for power transmission and reception to and from the power network during the scheduled period, and store associated information in the at least one memory,
wherein the consideration control unit is configured to associate, using the at least one processor, with the first user, the consideration information in accordance with the performance information.

14. A non-transitory computer-readable storage medium having stored thereon a program that causes a computer to perform operations comprising:
storing information indicating correspondences between a first user and a plurality of second users;
storing information indicating correspondences between the plurality of second users, and a plurality of vehicles that include driving power sources;
acquiring, from the first user, schedule information indicating a scheduled period during which at least a part of the plurality of vehicles are available for power transmission and reception with a power network;
associating, with the first user, consideration information indicating a consideration to be provided to the first user when at least a part of the plurality of vehicles are available for power transmission and reception with the power network during the scheduled period; and
causing a vehicle that is available for power transmission and reception with the power network, among the plurality of vehicles, to perform the power transmission and reception to and from the power network according to a power demand of the power network during the scheduled period.

* * * * *